Figure 1:
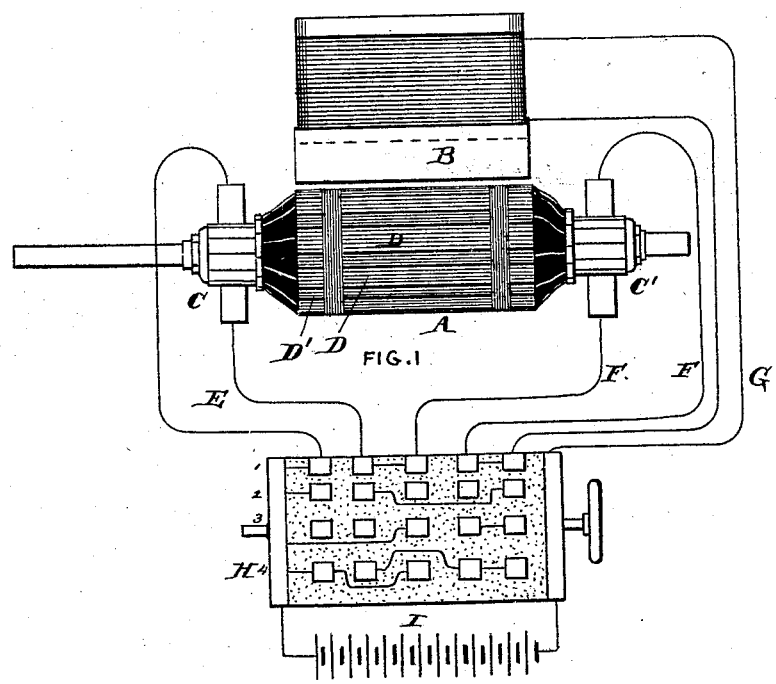

(No Model.)

J. W. HENDERSON.
ELECTRIC MOTOR OR DYNAMO ELECTRIC MACHINE.

No. 517,105. Patented Mar. 27, 1894.

Attest

Inventor
John W. Henderson

UNITED STATES PATENT OFFICE.

JOHN W. HENDERSON, OF PHILADELPHIA, PENNSYLVANIA.

ELECTRIC MOTOR OR DYNAMO-ELECTRIC MACHINE.

SPECIFICATION forming part of Letters Patent No. 517,105, dated March 27, 1894.

Application filed November 1, 1890. Serial No. 370,045. (No model.)

*To all whom it may concern:*

Be it known that I, JOHN W. HENDERSON, of the city and county of Philadelphia and State of Pennsylvania, have invented an Improvement in Electric Motors and Dynamos, of which the following is a specification.

My invention has reference to electric motors and dynamos and consists of certain improvements which are fully set forth in the following specification and shown in the accompanying drawings which form a part thereof.

The improvement herein set out is particularly applicable to electric motors for traction purposes, especially those employed in connection with cars operated by current derived from storage batteries carried by or moving with the cars, though they may be adapted to motors for stationary work or motors for traction in which the current is supplied from a stationary source by line conductors.

The object of my invention is to provide an electric armature with several sets of coils, each of which sets of coils is provided with an independent commutator and brushes, but secured to and rotating with the same shaft. The coils of the several sets have a different number of turns or lengths of wire or resistance, and constitute in reality distinct armatures, which may act independently or conjointly as desired in the effort to rotate the armature shaft. The several sets of coils may be employed independently or one at a time, or they may be coupled in series, or in multiple. For slow rotation or when a car is mounting a grade at a slower rate of speed than that upon the level, the coils of two or more sets are coupled in series so that greater resistance is inserted in the armature, and at the same time more coils be thereon for the passage of the energizing current, thereby producing an increased counterelectromotive force over what would be the result if the armature were of the same winding on the grade that it is upon the level. When on the grade, the motor has not only more work to perform in elevating the car, but as a rule rotates at a slower speed, and consequently reduces the counter-electromotive force, permitting a great waste of current with danger of destruction of the armature and field. The field is saturated and the excess of current passing through it when slowing the motor does not modify the magnetic condition of the field, and consequently the abnormal current which is forced through the armature is wasted, and at the same time endangers the insulation of the motor.

By my improvements in coupling of the several sets of coils in series when mounting the grade I prevent excessive passage of current through the motor, first by the increased resistance, and secondly by the increase in counter-electromotive force which is generated in the slow running armature with the increased winding over what took place with the same slow running armature with the smaller winding. My field remains saturated as before and the regulation is performed in the armature as distinguished from the field.

In practice I prefer to employ two sets of coils arranged about the armature in any suitable manner, but preferably with a portion of the coils of the respective sets of coils arranged alternately, and one of the sets of coils I prefer to form of twice the number of turns as the other set of coils, so that the length of one set of coils is twice that of the other set. On a level I prefer to use the set of coils having the greatest length, and cut the other set of coils entirely out of circuit. For increased work on the level where the speed is maintained I prefer to couple the two sets of coils in parallel. Where the work on the level is very small, and the speed is maintained or increased, I prefer to use the set of coils of the shortest winding, and cut the other set of coils out of circuit. When mounting a grade with a small load the longer winding may be employed alone, but where the load is considerable and the speed is slow I couple the two sets of coils in series as before described. It will be observed that the method of regulation employed is to increase the counter-electromotive force in the armature when the speed decreases, maintaining the field at the same or substantially the same condition, the object being to keep as near as possible the same current passing through the motor and the same counter-electromotive force for all speeds of the motor, and for all variations of load. It is evident that the field might be slightly varied in the well known manner by dividing its coils, and coupling them in various ways, but I do not find this necessary to the proper carrying out of my invention.

Figure 2:
Figure 3:
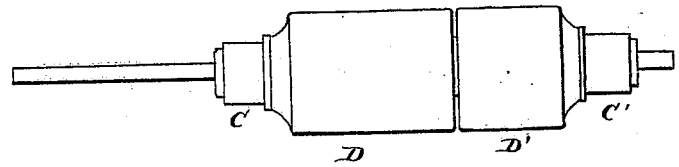

In the drawings:—Figure 1 is a diagram illustrating my improved electric motor, and its windings, and shows its connection with a source of electrical energy through the mediation of a regulator. Fig. 2 is a diagram illustrating the nature of the windings of the armature, and its connections with the two commutators; and Fig. 3 shows a modification of the armature illustrated in Fig. 1, the two sets of coils being divided in a plane transversely to the armature shaft.

A is the armature, and B is the field magnets.

C and C' are two commutators preferably arranged at opposite ends of the armature and respectively connected with the coils D and D', making up the winding of the armature. The coils D are of greater length or resistance or both than the coils D'. This is illustrated in Fig. 2, wherein it will be seen that coils D connecting with the commutator C are of twice the length of the coils D' connecting with the commutator. C'.

I is a source of electrical energy which may be a dynamo electric machine or a battery as indicated.

H is a regulator, which may be of any suitable construction, and is interposed between the source of electrical energy and the various circuits E, F and G of the motor. When the regulator is in the position shown the two sets of armature coils are coupled in series, and in series with the field. When the regulator is turned to point 2 the coils of the armature of greatest length are in series with the field, and the coils of shortest length are cut out. When the regulator is turned to point 3 the coils of greatest length are cut out, and the coils of the armature of shortest length are in series with the field. When the regulator is turned to the point 4 both sets of the coils of the armature are coupled in parallel and in series with the field.

In place of the arrangement of the winding shown in Fig. 1 for the armature the several coils may be arranged end to end as shown in Fig. 3. It is also evident that any number of sets of coils may be employed as desired.

While I have described my invention as especially applicable to electric motors it is to be understood that the construction is also adapted to armatures for dynamo electric machines employed in lighting and for generating currents for various purposes. In this connection it is evident that by properly coupling up the coils one of the sets of coils may be employed as a rotary converter for supplying a circuit containing translating or current consuming devices, while the other set of coils of the armature may be operated in connection with the field as an electric motor.

Having now described my invention, what I claim as new, and desire to secure by Letters Patent, is—

1. An armature for an electric motor and dynamo having independent sets of coils of wire of substantially the same diameter constituting its winding the length of wire in one set of coils being greater than the length of wire in the other set of coils, and independent commutators for the respective sets of coils.

2. An armature for an electric motor and dynamo having independent sets of coils constituting its winding the length of wire in one set of coils being greater than the length of wire in the other set of coils and in which the winding of the respective sets of coils are interposed uniformly throughout the entire circumference of the armature, independent commutators for the respective sets of coils and a regulator for coupling the two sets of coils in series, or cutting out one set of coils independently of the other.

3. The combination of an armature for an electric motor and dynamo having independent sets of coils of wire of substantially the same diameter constituting its winding the length of wire in one set of coils being greater than the length of wire in the other set of coils, independent commutators for the respective sets of coils, and a common field magnet to both sets of coils of the armature.

4. An armature for an electric motor having independent sets of coils constituting its winding the length of wire in one set of coils being greater than the length of wire in the other set of coils, and independent commutators for the respective sets of coils, in combination with a source of electrical energy, and a regulator for coupling the two sets of coils in series and cutting them out of circuit independently.

5. An armature for an electric motor having independent sets of coils constituting its winding the length of wire in one set of coils being greater than the length of wire in the other set of coils, and independent commutators for the respective sets of coils, in combination with a source of electric power, and a regulator for coupling the two sets of coils in series or cutting them out separately and maintaining the coil or coils energized in circuit with the field magnets.

6. An armature for an electric motor having independent sets of coils constituting its winding the length of wire in one set of coils being greater than the length of wire in the other set of coils, and independent commutators for the respective sets of coils, in combination with a source of electrical power, and a regulator for coupling the two sets of armature coils in series or multiple and cutting either set of coils out of circuit independently of the other.

7. An armature for an electric motor having independent sets of coils constituting its winding the length of wire in one set of coils being greater than the length of wire in the other set of coils, and independent commutators for the respective sets of coils, in combination with a field magnet common to both sets of coils of the armature, a source of electrical energy, and a regulator for maintaining the field magnet coils in series with the armature and coupling the armature coils in series or multiple or cutting one of the sets of coils out of circuit independently of the other without interfering with the electrical connection of the field magnets.

8. An armature for an electric motor having its winding formed of independent sets of coils of different electrical resistance, but formed of wire of substantially the same cross-section and independent commutators connected with the respective sets of coils.

9. An armature for an electric motor having its winding formed of independent sets of coils of different electrical resistance, and independent commutators connected with the respective sets of coils, in combination with a source of electrical energy, and a regulator for coupling said sets of coils in series or cutting one of the coils out of circuit independently of the other.

10. The method of regulating an electric motor consisting of maintaining a constant or substantially constant field and varying the length of wire on the armature inversely with the variations in the speed of the armature.

In testimony of which invention I have hereunto set my hand.

JOHN W. HENDERSON.

Witnesses:
ERNEST HOWARD HUNTER,
F. B. MEYER.